(12) United States Patent
Kukita

(10) Patent No.: US 7,391,549 B2
(45) Date of Patent: Jun. 24, 2008

(54) ELECTROCHROMIC MIRROR

(75) Inventor: Tomoyuki Kukita, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 21 days.

(21) Appl. No.: 10/934,741

(22) Filed: Sep. 7, 2004

(65) Prior Publication Data

US 2005/0068604 A1 Mar. 31, 2005

(30) Foreign Application Priority Data

Sep. 26, 2003 (JP) ............................. 2003-335433

(51) Int. Cl.
*G02F 1/153* (2006.01)
(52) U.S. Cl. ..................... 359/267; 359/604; 359/839
(58) Field of Classification Search ................ None
See application file for complete search history.

(56) References Cited

U.S. PATENT DOCUMENTS 5,321,544 A * 6/1994 Parkhe et al. ............... 359/273
5,724,187 A * 3/1998 Varaprasad et al. ......... 359/608
6,016,686 A * 1/2000 Thundat .................... 73/23.2
6,768,574 B2 * 7/2004 Bertran Serra et al. ...... 359/265

FOREIGN PATENT DOCUMENTS

JP A-2000-2895 1/2000

OTHER PUBLICATIONS

"New Electronic Thin Film Material", Chemical Industry Publication Co., Peking China, pp. 305-306), Sep. 2002.

* cited by examiner

*Primary Examiner*—Stephone B. Allen
*Assistant Examiner*—Derek S Chapel
(74) *Attorney, Agent, or Firm*—Berenato, White & Stavish

(57) ABSTRACT

An electrochromic mirror including a glass substrate, a transparent conductive film formed on the back of the glass substrate, an electrochromic layer formed on the back of the transparent conductive film, a reflection and electrode film formed on the back of the electrochromic layer in which the electrochromic layer and the reflection and electrode film are covered on the back thereof with an ion shielding oxide film, whereby the performance is stabilized and the productivity enhanced.

3 Claims, 2 Drawing Sheets

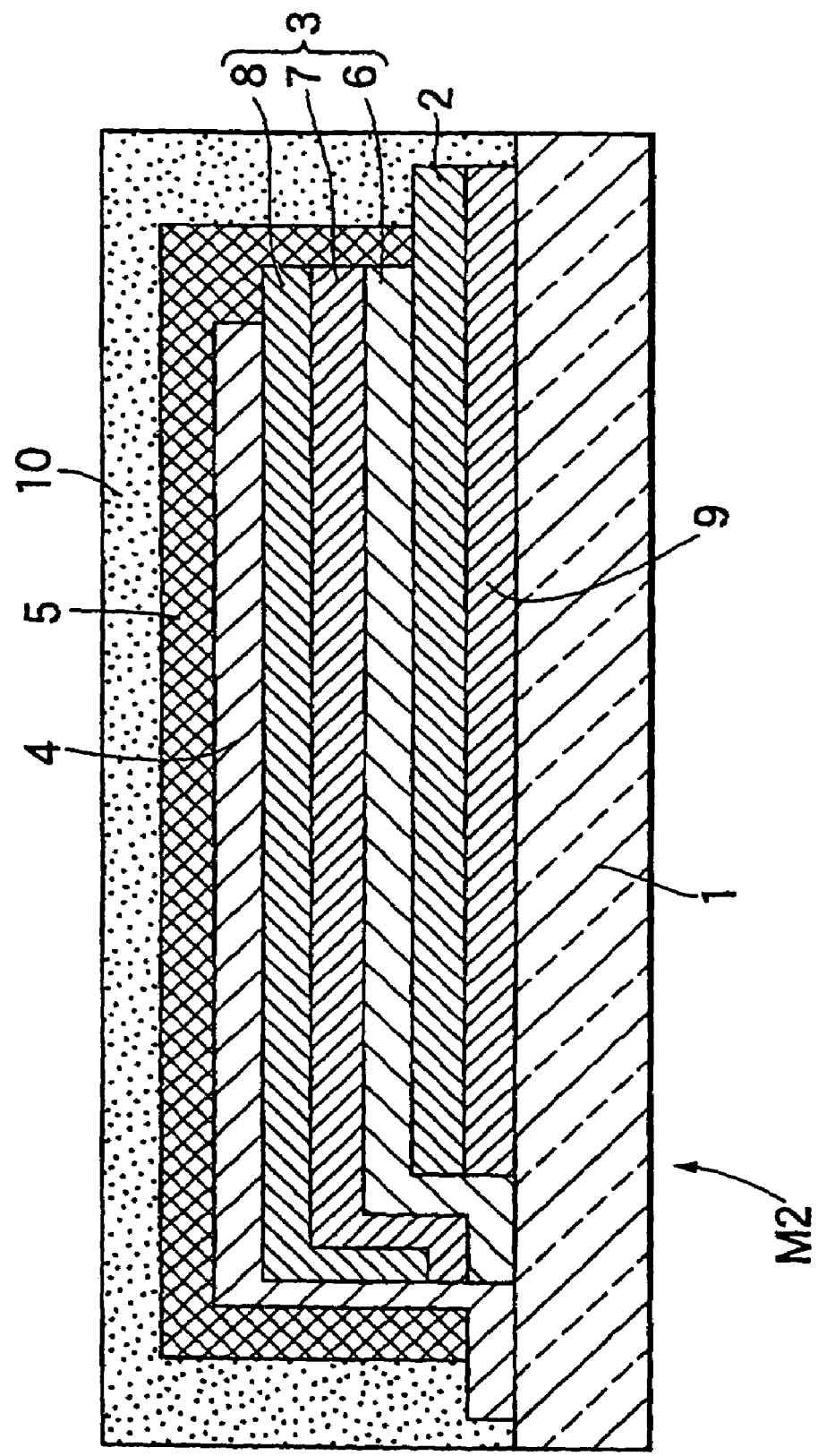

ELECTROCHROMIC MIRROR

CLAIM FOR PRIORITY

The present application claims priority from Japanese application JP 2003-335433 filed on Sep. 26, 2003, the content of which is hereby incorporated by reference into this application

BACKGROUND OF THE INVENTION

1. Field of the Invention

The present invention concerns an electrochromic mirror comprising a glass substrate, a transparent conductive film formed on the back of the glass substrate, an electrochromic layer formed on the back of the transparent conductive film and a reflection and electrode film formed on the back of the electrochromic layer.

2. Statement of Related Art

The electrochromic mirrors described above are used, for example, as anti-dazzling mirror for vehicles and disclosed, for example, in Japanese Patent Unexamined Publication (JP-A) No. 2000-2895.

By the way, the electrochromic layer is constituted with an electrolyte film, and an oxidation color forming film and a reduction color forming film putting the electrolyte film therebetween, in which ions transfer in the electrochromic layer due to hydrolysis of a trace amount of water content present in the electrolyte film to cause change between coloration and color extinction.

For example, in a case where the oxidation color forming film is an $IrO_n$ film, an electrolyte film is a $Ta_2O_5$ film, and a reduction color forming film is a $WO_3$ film, the following chemical changes are taken place upon color extinction and coloration in the oxidation color forming film, the electrolyte film and the reduction color forming film.

[Upon Color Extinction]
Oxidation color forming film; $Ir(OH)_n + xOH^-$
Electrolyte film; $Ta_2O_5 + xH_2O$
Reduction color forming film; $WO_3 + xH^+ + xe^-$
[Upon Coloration]
Oxidation color forming film; $Ir(OH)_{n+x} + xe^-$
Electrolyte film; $Ta_2O_5 + xH + xOH^-$
Reduction color forming film; $H_xWO_3$ When a potential difference is provided between the transparent conductive film and the reflection and electrode film, electron $e^-$ starts transfer at the electrodes on the side of the respective color forming films and a trace amount of water in the electrolyte is hydrolyzed by the energy of transfer to cause transfer of ions and, as a result, oxidation/reduction reaction is taken place in each of the color forming films to cause coloration and color extinction.

By the way, in each of the color forming films, positive ions ($H^+$) are attracted each other and such positive ions ($H^+$) result in repetitive oxidation and reduction. However, in a case where positive ions such as $Na^+$ are intruded to form, for example, NaOH or like other compound, ion conductivity in the film is lowered and the repetitive reaction occurs no more. Since various ions are present in atmospheric air and, among all, $Na^+$ ions are present in a great amount, it is necessary to shut the intrusion of ions from the outside into the electrochromic layer.

In JP-A No. 2000-2895 described above, the electrochromic layer is covered and protected with a resin film having ion shielding property, water proofness, moisture proofness and scratch resistance together for stabilizing the performance of the electrochromic mirror.

However, it is difficult to completely shield the ions by the resin film described above and, while the resin film is incorporated with metal oxides, ceramic powder and glass powder in the prior art, it is still difficult to completely shield the ions. In addition, since the method of forming the electrochromic layer and the method of forming the resin film are different from each other, this deteriorates the productivity.

SUMMARY OF THE INVENTION

The present invention has been achieved in view of the foregoing situations and intends to provide an electrochromic mirror stabilized for the performance by completely inhibiting intrusion of ions to an electrochromic layer and capable of improving the productivity.

The present invention provides an electrochromic mirror comprising a glass substrate, a transparent conductive film formed on the back of the glass substrate, an electrochromic layer formed on the back of the transparent conductive film and a reflection and electrode film formed on the back of the electrochromic layer, wherein the electrochromic layer and the reflection and electrode film are covered on the back thereof with an ion shielding oxide film comprising $Al_2O_3$ and $Ta_2O_5$.

In a preferred embodiment of the invention, the ion shielding oxide film described above comprises $Al_2O_3$ or $Ta_2O_5$.

In another preferred embodiment of the invention, an ionic shielding oxide film is interposed between the electrochromic layer and the glass substrate in the constitution described above.

In a further embodiment of the invention, a portion of the chromic mirror excepting for the glass substrate is covered with a corrosion inhibiting coating layer in the chromic mirror described above.

According to the present invention, since the ion shielding oxide film can completely inhibit traffic of ions, the performance of the electrochromic mirror can be stabilized and, in addition, since the ion shielding oxide film can be formed by sputtering or vapor deposition like the electrochromic layer, the productivity can be enhanced.

According to the preferred embodiment of the invention, since the ion shielding oxide film comprising $Al_2O_3$ or $Ta_2O_5$ can be formed easily, the productivity can be enhanced further.

According to another preferred embodiment of the invention, since the intrusion of ions also from the side of the glass substrate can be prevented, the performance can be stabilized further.

According to the further preferred embodiment of the invention, the transparent electroconductive film and the reflection and electrode film can be protected against corrosion.

BRIEF EXPLANATION OF THE DRAWINGS

Preferred embodiments of the present invention will be described in details based on the drawings, wherein FIG. 2 is a cross sectional view of an electrochromic mirror of a second embodiment according to the invention.

DESCRIPTION OF PREFERRED EMBODIMENTS OF THE INVENTION

Figure 1:
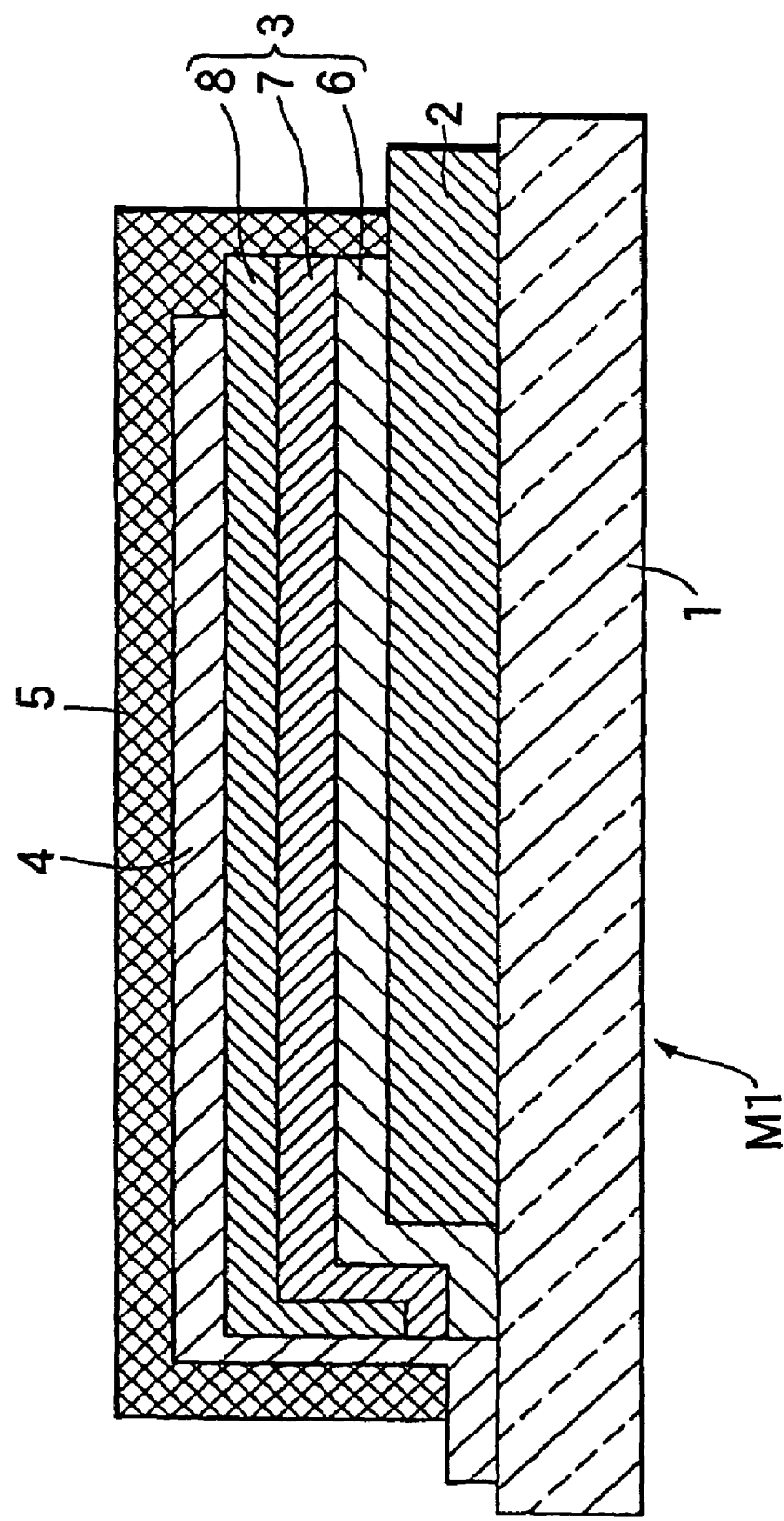
FIG. 1 is a cross sectional view of an electrochromic mirror of a first embodiment according to the invention.

The present invention is to be described by way of preferred embodiments with reference to the accompanying drawings.

FIG. 1 shows a first embodiment of the invention in which an electrochromic mirror M1 used as an anti-dazzling mirror for vehicles comprises a glass substrate 1, a transparent conductive film 2 formed on the back of the glass substrate 1, an electrochromic layer 3 formed on the back of the transparent conductive film 2, a reflection and electrode film 4 formed on the back of the electrochromic layer 3 and an ion shielding oxide film 5 covering the electrochromic layer 3 and the reflection and electrode film 4 on the back thereof.

The transparent conductive film 2 is formed of a transparent conductive material such as ITO (Indium-Tin Oxide) or $SnO_2$ into a film of 1000 Å thickness having an electric resistance, for example, of 15 Ω or less and a: transmittance, for example, of 90% at the lowest.

The electrochromic layer 3 is formed by stacking a reduction color forming film 6, an electrolyte film 7 and an oxidation color forming layer 8 stacked orderly from the side of the transparent conductive film 2. The reduction color forming film 6 is formed of a reduction color forming material, for example, $WO_3$, $MnO_3$, $V_2O_5$, or the like into a film of 2000 to 5000 Å thickness. The electrolyte film 7 is formed, for example, of $Ta_2O_5$ into a film of 5500 Å thickness. The oxidation color forming film 8 contains a metal oxide in a film comprising, for example, $SnO_2$—$IRO_2$, $Cr_2O_3$, $RhO_xNiO_x$ or the like by an optimal amount while considering the absorptivity. In this first embodiment, it is formed from $SnO_2$—$IrO_2$ containing $IrO_2$ by 10 mol % at the maximum in $SnO_2$ into a film of from 1000 to 2000 Å thickness.

The reflection-electrode film 4 is formed, for example, of reflection-electrode film material such as Al (aluminum), Ag, Cr, Ni, Ni—Cr or the like into a film of 1000 Å thickness which has an electric resistance, for example, of 15Ω or less and a transmittance of 90% at the lowest.

Further, the ion insulative oxide film 5 is formed, for example, of $Al_2O_3$ into a film of 1000 Å thickness at the minimum.

The transparent conductive film 2, the reduction color forming film 6, the electrolyte film 7 and the oxidation color forming film 8 in the electrochromic layer 3, the reflection and electrode film 4 and the ion shielding oxide film 5 are formed into films each by an identical film forming method such as sputtering or vapor deposition.

Referring to the function of the first embodiment, the ion shielding oxide film 5 can completely inhibit the traffic of ions and, since the electrochromic layer 3 and the reflection-electrode film 4 are covered at the back thereof by the ion shielding oxide film 5, the performance of the electrochromic mirror M1 can be stabilized.

In addition, since the ion shielding oxide film 5 is formed by the film forming method identical with that for the transparent conductive film 2, the reduction color forming film 6, the electrolyte film 7, the oxide color forming film 8 and the reflection and electrode film 4, the productivity of the electrochromic mirror M1 can be enhanced.

Further, since the ion shielding oxide film 5 comprises $Al_2O_3$, the ion shielding oxide film 5 can be formed easily into a film to further enhance the productivity.

As a modified example of the first embodiment, the ion shielding oxide film 5 may be formed of $Ta_2O_5$. Also in this case, the ion shielding oxide film 5 can be formed into a film easily to enhance the productivity.

FIG. 2 shows a second embodiment of the invention in which portions corresponding to those in the first embodiment carry same reference numerals.

An electrochromic mirror M2 further includes, in addition to the constitution of the electrochromic mirror M1 of the first embodiment, an additional ion shielding oxide film 9 interposed between the glass substrate 1 and the electrochromic layer 3, and a corrosion preventive coating layer 10. The additional ion shielding oxide film 9 is interposed between the glass substrate 1 and the transparent conductive film 2. The corrosion inhibitive coating layer 10 covers the outer periphery of the transparent conductive film 2, the additional ion shielding oxide film 9, the electrochromic layer 3, the reflection and electrode film 4 and the ion shielding oxide film 5, excepting for the glass substrate 1.

The additional ion shielding oxide film 9 is formed of $Al_2O_3$ or $Ta_2O_5$ into a film, for example, of 300 Å thickness. The corrosion preventive coating layer 10 can be obtained, for example, by forming a thin coating film comprising a coating material containing, for example, 30% xylene, 10% 1-butanol and 6% zinc chromate by dip coating or spin coating, and then drying by a hot blow at 150 to 200° C. for 3 to 4 min, or by forming a thin coating film comprising, for example, silicone series, epoxy series or urethane series coating agent by dip coating or spin coating and then applying a hot blow drying at 150 to 200° C. and a UV-curing treatment.

According to the second embodiment, the effect of the first embodiment can be obtained and, in addition, the additional ion shielding oxide film 9 can prevent the intrusion of ions from the side of the glass substrate 1 into the electrochromic layer 3 to further stabilize the performance.

Further, the corrosion inhibitive coating layer 10 can prevent the transparent conductive film 2 and the reflection-electrode film 4 against corrosion.

While the present invention has been described with reference to preferred embodiments but the invention is not restricted to such embodiments and various design changes can be made without departing the gist of the invention as described in the scope of the claim for patent.

What is claimed is:

1. An electrochromic mirror comprising:
    a glass substrate on one side thereof;
    a transparent conductive film formed on the back of the glass substrate;
    an electrochromic layer formed on the back of the transparent conductive film;
    a reflection and electrode film formed on the back of the electrochromic layer;
    the electrochromic layer and the reflection and electrode film being covered from the back thereof with an ion shielding oxide film comprising $Al_2O_3$ or $Ta_2O_5$ for preventing atmospheric ions from intruding into the electrochromic layer; and
    an additional ion shielding oxide film comprising $Al_2O_3$ or $Ta_2O_5$; the additional ion shielding oxide film being interposed between the glass substrate and the transparent conductive film for preventing ions from intruding from the glass substrate to the inside of the electrochromic layer.

2. The electrochromic mirror according to claim 1, wherein a portion of the electrochromic mirror excepting for the glass substrate is covered with a corrosion inhibitive coating layer.

3. The electrochromic mirror according to claim 1, wherein the ion shielding oxide film is covered from the back thereof with a corrosion inhibitive coating layer.

* * * * *